US011337288B2

(12) United States Patent
Middelbos et al.

(10) Patent No.: US 11,337,288 B2
(45) Date of Patent: May 17, 2022

(54) DEVICE FOR THE INTERACTIVE AND LOCATION-DEPENDENT CONTROL OF LIGHTING PROPERTIES

(71) Applicant: LIFTSENS HOLDING B.V., Enschede (NL)

(72) Inventors: Roy Middelbos, Enschede (NL); Hendrik Frederik Jan Anton Nijs, Enschede (NL)

(73) Assignee: LIFTSENS HOLDING B.V., Enschede (NL)

( * ) Notice: Subject to any disclaimer, the term of this patent is extended or adjusted under 35 U.S.C. 154(b) by 0 days.

(21) Appl. No.: 17/285,959

(22) PCT Filed: Oct. 10, 2019

(86) PCT No.: PCT/NL2019/050673
§ 371 (c)(1),
(2) Date: Apr. 16, 2021

(87) PCT Pub. No.: WO2020/080935
PCT Pub. Date: Apr. 23, 2020

(65) Prior Publication Data
US 2021/0345470 A1    Nov. 4, 2021

(30) Foreign Application Priority Data

Oct. 18, 2018  (NL) ...................................... 2021833

(51) Int. Cl.
*H05B 47/125* (2020.01)
*H05B 47/13* (2020.01)
(Continued)

(52) U.S. Cl.
CPC ......... *H05B 47/125* (2020.01); *G06V 40/172* (2022.01); *H05B 45/10* (2020.01); *H05B 45/20* (2020.01); *H05B 47/13* (2020.01)

(58) Field of Classification Search
None
See application file for complete search history.

(56) References Cited

U.S. PATENT DOCUMENTS

| 2012/0206050 A1 | 8/2012 | Spero |
| 2014/0001955 A1 | 1/2014 | Bouffay et al. |

(Continued)

FOREIGN PATENT DOCUMENTS

| EP | 2498583 A1 | 9/2012 |
| WO | 2015054611 A1 | 4/2015 |
| WO | 2017162504 A1 | 9/2017 |

*Primary Examiner* — Dedei K Hammond
(74) *Attorney, Agent, or Firm* — The Webb Law Firm

(57) ABSTRACT

A device for interactive and location-dependent control of lighting properties, such as intensity or colour temperature, of at least one LED high bay with a downward directed light beam, in for instance a warehouse or industrial premises. The device includes a control for controlling at least one LED high bay; a presence sensor which emits a presence signal to the control when the presence sensor detects a person or object, such as a forklift truck driver or a forklift truck; and includes an activity sensor which emits an activity signal to the control when an activity, such as for instance a lifting movement of a forklift truck, is detected and the control, when the presence signal and the activity signal are received simultaneously, generates a control signal for the control of the intensity level of the at least one LED high bay.

20 Claims, 2 Drawing Sheets

(51) Int. Cl.
*H05B 45/10* (2020.01)
*H05B 45/20* (2020.01)
*G06V 40/16* (2022.01)

(56) References Cited

U.S. PATENT DOCUMENTS

| | | | |
|---|---|---|---|
| 2014/0320023 A1* | 10/2014 | Cannon | H05B 45/10 |
| | | | 315/153 |
| 2016/0200240 A1* | 7/2016 | Quinlan | F21V 5/04 |
| | | | 315/80 |
| 2016/0231573 A1 | 8/2016 | Mullins et al. | |
| 2016/0360594 A1 | 12/2016 | Chemel | |
| 2019/0098725 A1* | 3/2019 | Sadwick | H05B 45/20 |
| 2019/0132927 A1 | 5/2019 | De Bruijn et al. | |

* cited by examiner

DEVICE FOR THE INTERACTIVE AND LOCATION-DEPENDENT CONTROL OF LIGHTING PROPERTIES

CROSS-REFERENCE TO RELATED APPLICATIONS

This application is the United States national phase of International Application No. PCT/NL2019/050673 filed Oct. 10, 2019, and claims priority to The Netherlands Patent Application No. 2021833 filed Oct. 18, 2018, the disclosures of which are hereby incorporated by reference in their entirety.

BACKGROUND OF THE INVENTION

Field of the Invention

The invention relates to a device for interactive and location-dependent control of lighting properties, such as intensity or colour temperature, of at least one LED high bay with a downward directed light beam, in for instance a warehouse or industrial premises, wherein the device comprises:
a control for controlling at least one LED high bay;
a presence sensor which emits a presence signal to the control when the presence sensor detects a person or object, such as a forklift truck driver or a forklift truck.

Description of Related Art

LED lighting is used in an increasing number of fields of application as replacement for more traditional lighting. The widely known advantages of LED lighting, such as for instance the low power consumption and the comparatively very long lifespan, are important reasons for the continuing proliferation of LED lighting.

In industrial premises, such as for instance warehouses, high standards are set for the lighting in respect of safety and working conditions. In such applications traditional high bays are also increasingly being replaced with LED high bays.

A drawback of the extremely high light output of LED lighting is that blinding can easily occur when the LED source is in direct view. Specifically in application in LED high bays, such blinding is common for instance forklift truck drivers, who look upward when working at height with the platform of the forklift truck. The blinding due to the direct view of the light source therefore creates dangerous situations.

Although it would seem self-evident, given the blinding when looking up, to use less bright lighting, it is of course not the case that the high light output of LED has only drawbacks. When work is not being carried out at height, and it is therefore not necessary to look upward, the high light output of LED high bays is on the contrary a great advantage, since the working environment can be illuminated very well.

The use of a presence sensor for locally reducing the intensity of the lighting in order to prevent direct blinding, wherein a personal lighting profile could exist as described in WO2015/054611, has the drawback that the lighting shines brightly only when nobody is present in the detection area of the presence sensor. The intensity of the lighting will then also be reduced when it is not necessary to look upward to carry out operations.

SUMMARY OF THE INVENTION

It is now an object of the invention to alleviate or even obviate the above stated drawbacks.

This object is achieved with a device comprising an activity sensor which emits an activity signal to the control when an activity, such as for instance a lifting movement of a forklift truck, is detected and wherein the control, when the presence signal and the activity signal are received simultaneously, generates a control signal for the control of the intensity level of the at least one LED high bay.

The addition of an activity sensor to a light control provides the option of modifying the characteristic of the light in the specific case that an activity takes place. By reducing the intensity of the lighting of the LED high bay to a level which is not or which is less blinding for as long as an activity takes place in the light beam of the lamp wherein a person has to look toward the lighting source, the chance of a dangerous situation occurring due to the blinding of the forklift truck driver can be reduced or even obviated.

In another embodiment according to the invention the activity sensor comprises face recognition, wherein the face recognition comprises a camera, which camera is configured to record an image within a downward directed light beam, wherein the activity sensor emits an activity signal to the control upon recognition of a face in the image.

By focusing the activity sensor specifically on recognizing the activities during which the face of a person is turned toward the light source, the intensity level of the light beam can be selectively reduced in simple manner and without the need for further equipment. In the case that a person is located within the light beam, and therefore also within the recording range of the camera, and turns their face upward, a face will become recognizable in the image which is being recorded by the camera, and the activity signal can be emitted. If the person turns their face away from the source of the light beam, a face can no longer be recognized and the lighting can also return to the higher intensity level again.

Another advantage of the use of face recognition is that in the case of activities where the light source is being faced in upward direction but there is an obstruction between the person and the light source whereby no blinding can occur, the intensity level of the lighting is not reduced either during the activity.

In another embodiment according to the invention the activity sensor comprises the presence sensor and also emits a presence signal to the control when an activity is detected.

Since the detection of an activity within the light beam also implies the presence of a person or object, the two sensors can be combined well.

In a preferred embodiment according to the invention the presence sensor comprises a passive infrared sensor (PIR sensor).

PIR sensors are very inexpensive and simple in use. By performing the presence detection on the basis of a PIR sensor the device can be given an inexpensive form.

The invention further comprises a combination of a device according to the invention and at least one LED high bay with a downward directed light beam, wherein the at least one LED high bay receives a control signal from the control in order to control the intensity level of the light beam.

By combining the device with an LED high bay which is able to control the intensity of the light beam on the basis of a control signal the intended effect of controlling the intensity level of the lighting on the basis of a detect presence and activity can be achieved. The control signal can take different forms, for instance a simple on/off signal, but more complicated signals are also possible. The essence of the control signal for the invention is that the intensity level of the LED high bay can be controlled on the basis of the control signal.

In another preferred embodiment according to the invention the at least one LED high bay sets the intensity of the light beam from a first intensity level to a second, lower intensity level when the control signal is received, and sets the first intensity level when the first control signal is absent.

The intensity level of the lighting is reduced in order to prevent direct blinding of for instance a forklift truck driver who is looking upward while performing a lifting movement with a forklift truck. If no more activity is detected, the LED high bay can return to the first intensity level again. A normal amount of light is thereby available when operations are being carried out wherein it is not necessary to look toward the lighting source.

In an embodiment of the invention the second intensity level is 1-50% of the first intensity level, preferably 5-20%, preferably 20%.

Depending on the characteristic of the LED high bay, the degree of reduction of the intensity level which is needed to prevent direct blinding can be determined within a percentage of the normal lighting level. Depending on the situation in situ, a valid reduction may even be to switch the lamp off completely.

In another embodiment according to the invention the at least one LED high bay also sets the colour temperature of the light beam, this in addition to the intensity level, from a first colour temperature to a second, lower colour temperature when the control signal is received, and sets the first colour temperature when the first control signal is absent.

The colour temperature can also play a part in the perception of the brightness of a light source. By reducing not only the intensity, but also the colour temperature of the light beam the comfort of the person looking into the light beam can possibly be increased still further.

In an embodiment of the invention the second colour temperature is 1500-4000K lower than the first colour temperature, preferably 2500-3500K lower.

The degree to which the colour temperature must be reduced in order to increase the comfort of the person looking into the lamp depends among other things on the colour temperature of the first level. In the case of for instance lighting with a colour temperature corresponding to daylight, about 6500K, the necessary reduction is greater than in the case of a lamp with a colour temperature of 5300K.

In another preferred embodiment of the invention the combination further comprises a vehicle, which vehicle comprises a liftable platform and a platform control, such as a forklift truck or boom lift, wherein the activity sensor is arranged on the vehicle and wherein the platform control activates the activity sensor.

By arranging an activity sensor on the platform control of for instance a forklift truck, and coupling the activation of the sensor to a known activity wherein it is necessary to look up frequently, such as for instance the lifting of the lifting platform, the activity during which the intensity and/or the colour temperature must be reduced can be detected in an inexpensive and effective manner. The activity sensor can for instance also be mounted such that it is activated at a determined height of the forks, grabber or other attachment of the forklift truck.

BRIEF DESCRIPTION OF THE DRAWINGS

These and other features of the invention are further elucidated with reference to the accompanying drawings.

DESCRIPTION OF THE INVENTION

Figure 1:
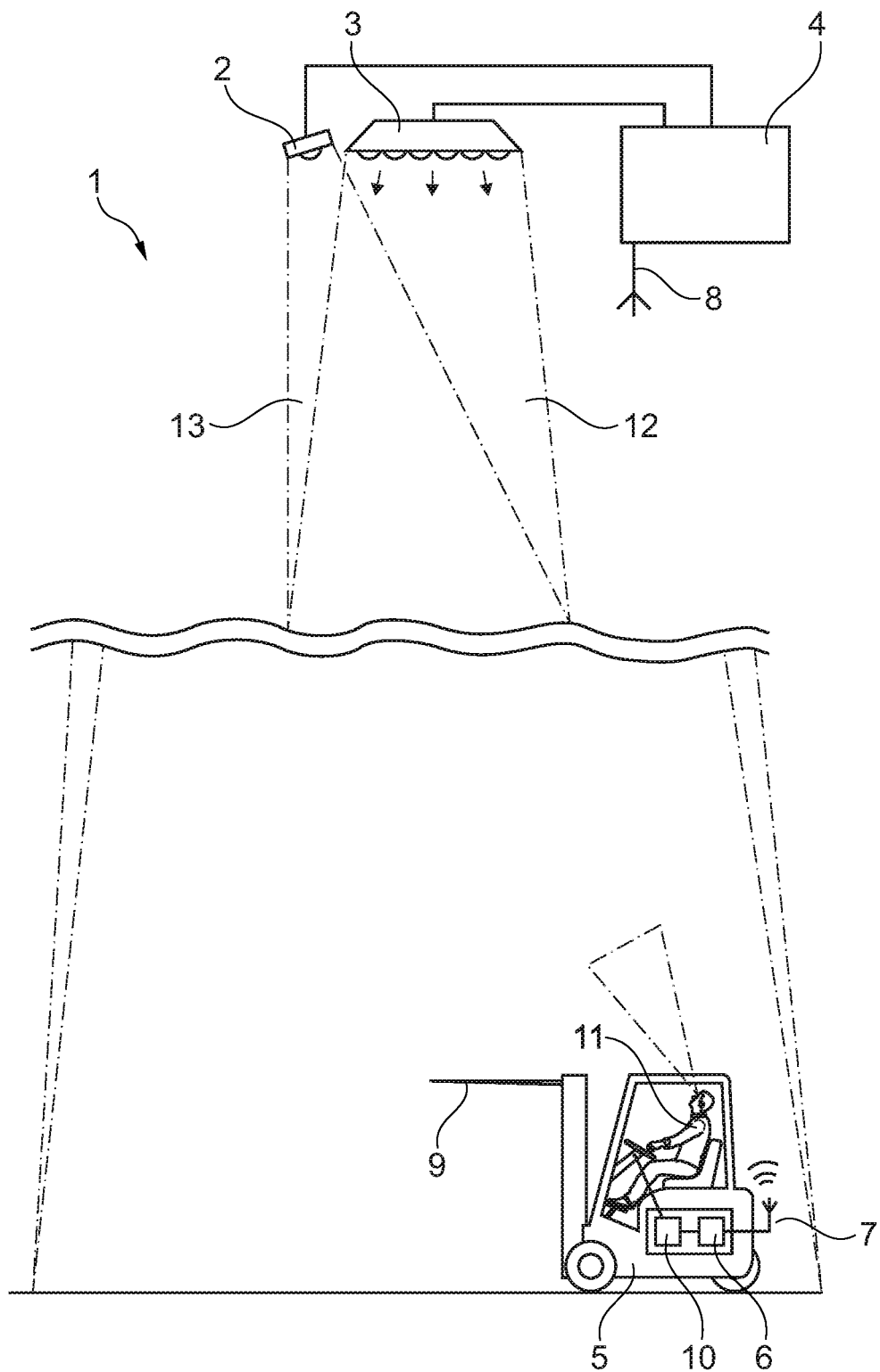
FIG. 1 shows a schematic view of a first embodiment of a combination according to the invention.

FIG. 1 shows schematically a first embodiment of a combination 1 according to the invention, consisting of a PIR sensor 2, an LED high bay 3, a control 4, a forklift truck 5 and an activity sensor 6. In the figure the PIR sensor 2 and the LED high bay 3 are directly connected to control 4. Activity sensor 6 sends an activity signal wirelessly to control 4. The necessary transmitter module is not shown; only the antenna 7 used by the transmitter module. Control 4 is in this case provided with the necessary receiving module, of which also only an antenna 8 is shown schematically. Forklift truck 5 has a liftable platform 9 and a platform control 10. In the figure platform 9 is shown in a high position, wherein forklift truck driver 11 is looking in the direction of LED high bay 3. The downward directed light beam 12 and the detection area 13 are further shown in the figure. It is also clearly visible that light beam 12 and detection area 13 primarily overlap.

When forklift truck 5 travels into the detection area 13 of the PIR sensor 2, PIR sensor 2 will emit a presence signal to control 4. The intensity level of light beam 12 of LED high bay 3 is still high at that moment, since no detection of an activity has taken place yet. If forklift truck driver 11 now starts a lifting movement of platform 9 by means of operating the platform control 10, activity sensor 6 will be activated. This sends an activity signal to control 4. Because both the presence signal and the activity signal are then present, control 4 will send a control signal to LED high bay 3, which can reduce the intensity level of light beam 12 to the lower level on the basis of the received control signal. Blinding of forklift truck driver 11 can hereby be prevented.

Figure 2:
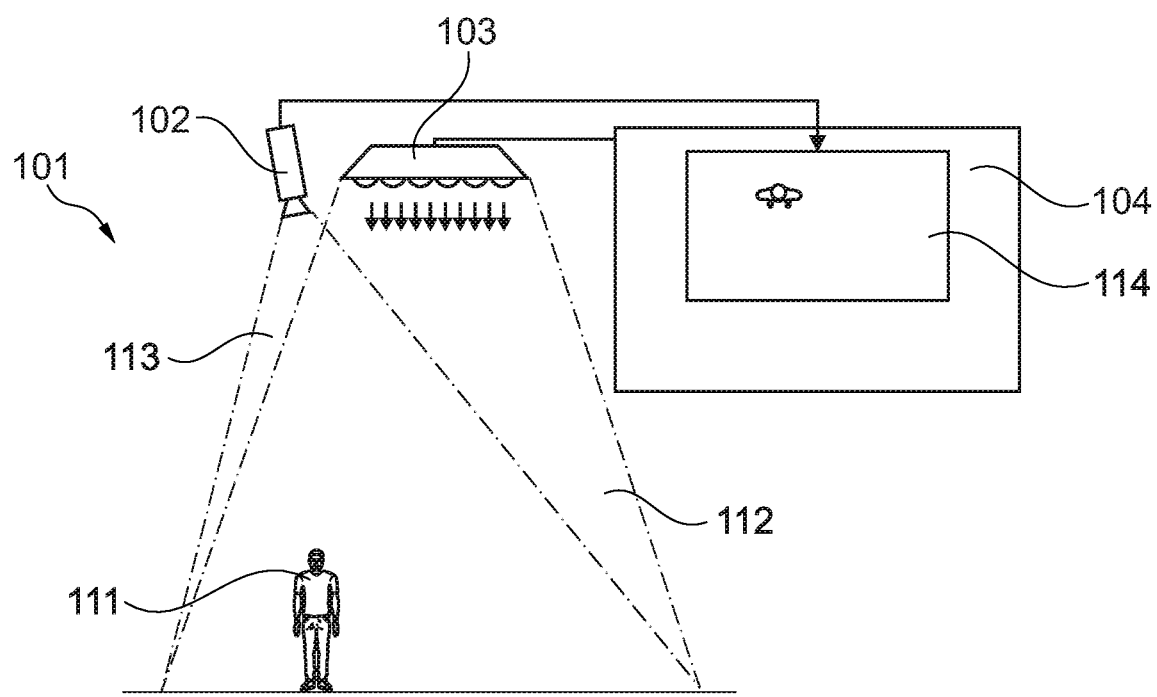
FIG. 2 shows a schematic view of a second embodiment of a combination according to the invention, wherein the activity sensor comprises face recognition.

FIG. 2 shows a second embodiment of a combination 101 according to the invention, consisting of a camera 102 which serves as activity sensor and presence sensor, an LED high bay 103 and a control 104. The intensity of light beam 112 is high, designated with the number of arrows coming off LED high bay 103. The area 113 which is in view of camera 102 overlaps the light beam 112 of LED high bay 103. In the image 114 of camera 102 the face of person 111 is not visible, and can therefore not be recognized either. Although camera 102 could detect that an image of a person 111 is present in image 114, it is unnecessary to do so. This is because control 104 will only send a control signal to LED high bay 103 when an activity is also detected.

Figure 3:
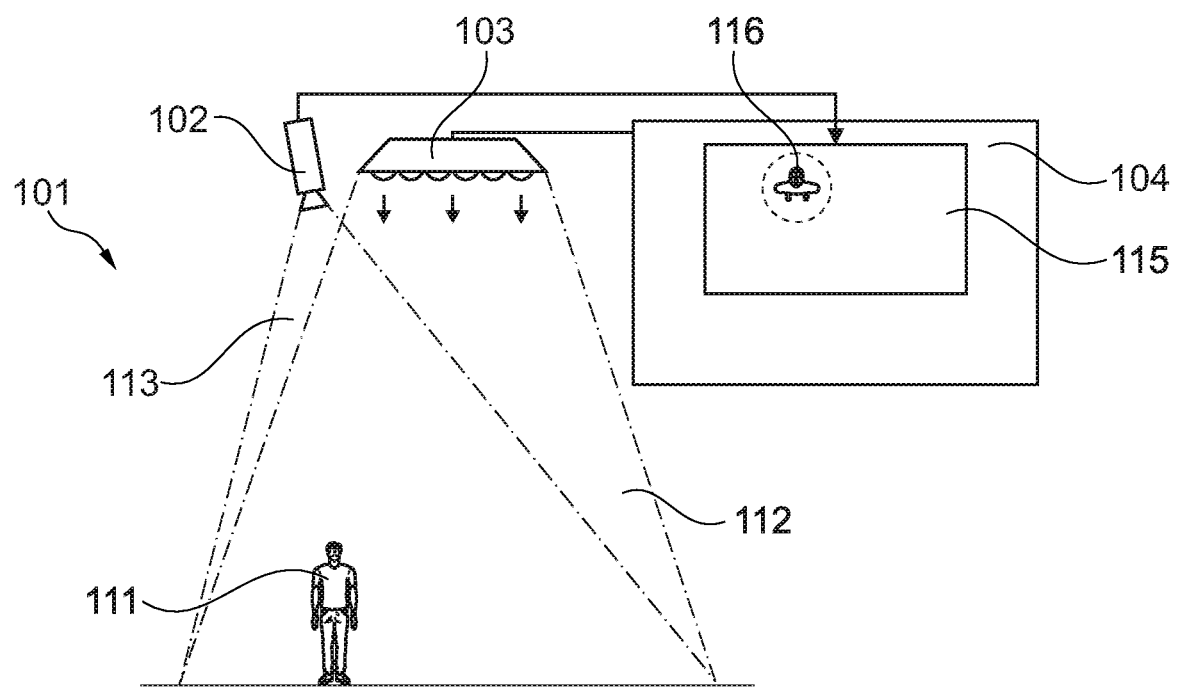
FIG. 3 shows a schematic view of the embodiment of FIG. 2, wherein the activity sensor has recognized a face.

In FIG. 3 the intensity of light beam 112 is low, designated with the reduced number of arrows coming off LED high bay 103, since the face 116 of person 111 has been recognized in the image 115 of camera 102, in the circled part of image 115. The detection of the face 116 implies the presence of a person 111, so control 104 can send a control signal to LED high bay 103, which can reduce the intensity level of light beam 112 to the lower level on the basis of the received control signal.

The invention claimed is:

1. A combination of a device for interactive and location-dependent control of lighting properties of at least one LED high bay with a downward directed light beam, in a warehouse or industrial premises; and a vehicle comprising a liftable platform and a platform control, wherein the device comprises:

a control for controlling the at least one LED high bay;

a presence sensor which emits a presence signal to the control when the presence sensor detects a person or an object; and an activity sensor which emits an activity signal to the control when an activity is detected and wherein the control, when the presence signal and the activity signal are received simultaneously, generates a control signal for the control of an intensity level of the at least one LED high bay, wherein the at least one LED high bay receives the control signal from the control in order to control the intensity level of the light beam, and the activity sensor is arranged on the vehicle and wherein the platform control activates the activity sensor.

2. The combination according to claim 1, wherein the activity sensor comprises face recognition, wherein the face recognition comprises a camera, wherein the camera is configured to record an image within the downward directed light beam, wherein the activity sensor emits an activity signal to the control upon recognition of a face in the image.

3. The device according to claim 2, wherein the activity sensor comprises the presence sensor and also emits a presence signal to the control when an activity is detected.

4. The device according to claim 3, wherein the presence sensor comprises a passive infrared sensor (PIR sensor).

5. The device according to claim 2, wherein the presence sensor comprises a passive infrared sensor (PIR sensor).

6. The combination according to claim 1, wherein the activity sensor comprises the presence sensor and also emits a presence signal to the control when an activity is detected.

7. The device according to claim 6, wherein the presence sensor comprises a passive infrared sensor (PIR sensor).

8. The combination according to claim 1, wherein the presence sensor comprises a passive infrared sensor (PIR sensor).

9. The combination according to claim 1, wherein the at least one LED high bay sets the intensity of the light beam from a first intensity level to a second, lower intensity level when the control signal is received, and sets the first intensity level when the control signal is absent.

10. The combination according to claim 9, wherein the second intensity level is one of 1-50%, 5-20%, or 20% of the first intensity level.

11. The combination according to claim 10, wherein the at least one LED high bay also sets a colour temperature of the light beam, in addition to the intensity level, from a first colour temperature to a second, lower colour temperature when the control signal is received, and sets the first colour temperature when the first control signal is absent.

12. The combination according to claim 10, wherein the vehicle comprises a forklift truck or boom lift.

13. The combination according to claim 9, wherein the at least one LED high bay also sets a colour temperature of the light beam, in addition to the intensity level, from a first colour temperature to a second, lower colour temperature when the control signal is received, and sets the first colour temperature when the first control signal is absent.

14. The combination according to claim 9, wherein the vehicle comprises a forklift truck or boom lift.

15. The combination according to claim 1, wherein the at least one LED high bay also sets the sets a colour temperature of the light beam, in addition to the intensity level, from a first colour temperature to a second, lower colour temperature when the control signal is received, and sets the first colour temperature when the first control signal is absent.

16. The combination according to claim 15, wherein the second colour temperature is 1500-4000K lower than the first colour temperature.

17. The combination according to claim 16, wherein the vehicle comprises a forklift truck or boom lift.

18. The combination according to claim 15, wherein the vehicle comprises a forklift truck or boom lift.

19. The combination according to claim 1, wherein the vehicle comprises a forklift truck or boom lift.

20. The combination according to claim 1, wherein, at least one of the following:

the person is a forklift truck driver;

the object is a forklift truck;

the activity is a lifting movement of the object; and the lighting properties include the intensity or a colour temperature.

* * * * *

UNITED STATES PATENT AND TRADEMARK OFFICE
CERTIFICATE OF CORRECTION

| | | |
|---|---|---|
| PATENT NO. | : 11,337,288 B2 | Page 1 of 1 |
| APPLICATION NO. | : 17/285959 | |
| DATED | : May 17, 2022 | |
| INVENTOR(S) | : Middelbos et al. | |

It is certified that error appears in the above-identified patent and that said Letters Patent is hereby corrected as shown below:

In the Claims

Column 5, Line 14, Claim 1, delete "hay" and insert -- bay --

Column 6, Line 22, Claim 15, delete "also sets the" and insert -- also --

Signed and Sealed this
Twelfth Day of July, 2022

*Katherine Kelly Vidal*

Katherine Kelly Vidal
*Director of the United States Patent and Trademark Office*